United States Patent [19]

Mariol et al.

[11] Patent Number: 4,596,489

[45] Date of Patent: Jun. 24, 1986

[54] TRAFFIC DELINEATOR

[75] Inventors: James F. Mariol; Edward G. McAuley, both of Cincinnati, Ohio

[73] Assignee: Datum Plastic Molding, Inc., Cincinnati, Ohio

[21] Appl. No.: 650,906

[22] Filed: Sep. 13, 1984

[51] Int. Cl.⁴ .............................................. E01F 9/00
[52] U.S. Cl. ......................................... 404/10; 404/9
[58] Field of Search ................... 404/6, 9, 10, 12, 13, 404/14; 40/608, 612, 606, 610; 411/508; 248/158, 160, 346, 519, 677; 52/28, 40, 108, 99, 98, 100, 296, 297, 726, 738; 116/63 R, 63 P

[56] References Cited

U.S. PATENT DOCUMENTS

| | | | |
|---|---|---|---|
| 1,901,333 | 3/1933 | Parkhurst | 404/10 |
| 2,258,560 | 10/1941 | Trunzer | 40/606 |
| 4,079,559 | 3/1978 | Tenbrummeler | 248/519 |
| 4,092,081 | 5/1978 | Schmanski | 404/10 |
| 4,123,183 | 10/1978 | Ryan | 404/10 |
| 4,249,357 | 2/1981 | Cornou | 52/728 |
| 4,269,534 | 5/1981 | Ryan | 404/10 |
| 4,343,567 | 8/1982 | Sarver et al. | 404/10 |

FOREIGN PATENT DOCUMENTS

| | | | |
|---|---|---|---|
| 2834200 | 2/1980 | Fed. Rep. of Germany | 411/508 |
| 275331 | 8/1951 | Switzerland | 52/738 |
| 415936 | 9/1934 | United Kingdom | 404/9 |

OTHER PUBLICATIONS

Carsonite, The SSMD Super Duck.
Carsonite, Barrier Delineator Marker BD-360.
Carsonite, Rubber Duckie Surface Mounted Delineator, SMD-300.
Bent Mfg. Co., Up-Rite, Glue-Down Posts.
Unipar, Inc., Evaflex, Tubular Guide Post.
Services & Materials Co., Inc., Flexible Fiberglass Delineator Posts, p. 40.

Primary Examiner—James A. Leppink
Assistant Examiner—Matthew Smith
Attorney, Agent, or Firm—Wood, Herron & Evans

[57] ABSTRACT

A traffic delineator includes a post having a collapsible, box-like cross-section and a base for mounting the post upright and securing it to a road surface. Inwardly disposed sidewalls of the post collapse inwardly at a bend area when the post is hit by a vehicle, permitting the post to collapse and bend through 90° or more, yet the post self-restores itself to an elongated, unbent position when the vehicle moves away. A base includes receptacle surfaces and pins for engaging and securing the post therein, together with a lower surface configuration enhancing the adhesive attachment of the base to a surface.

34 Claims, 10 Drawing Figures

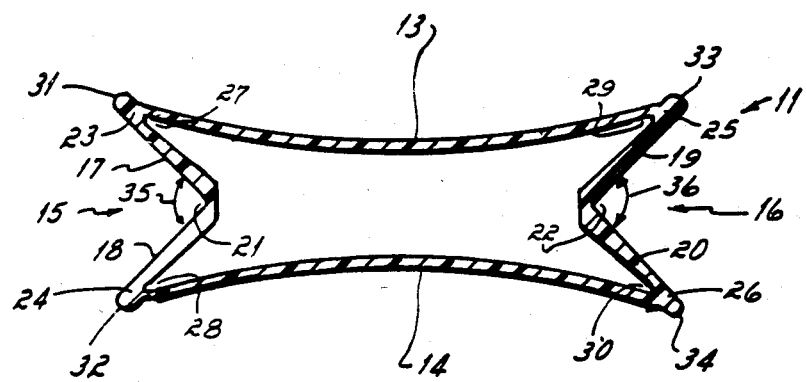
FIG. 3
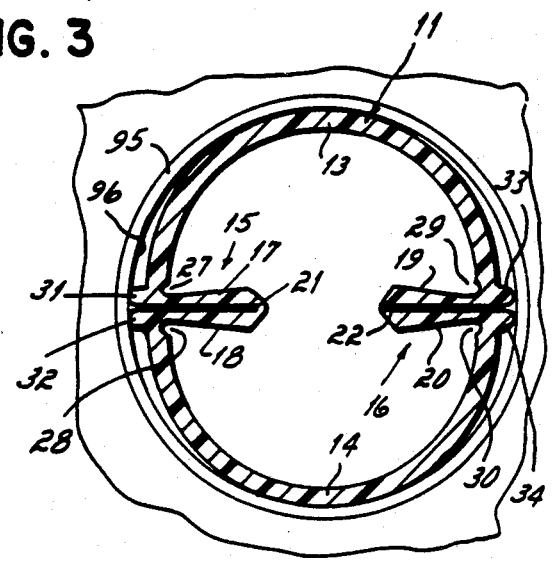
FIG. 4A
FIG. 4B
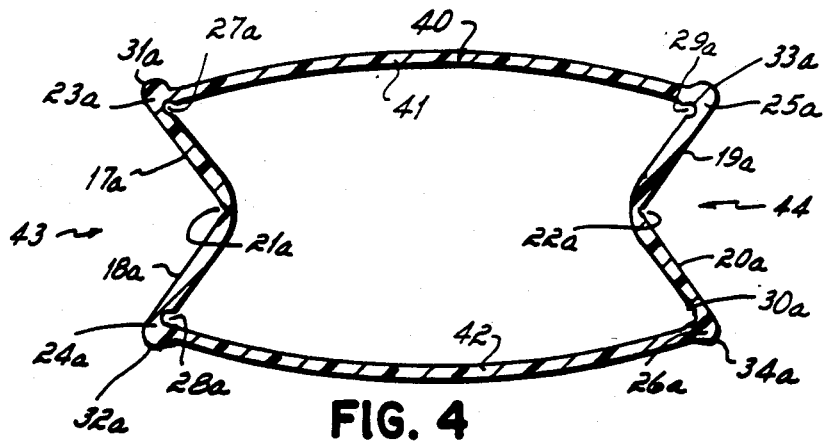
FIG. 4

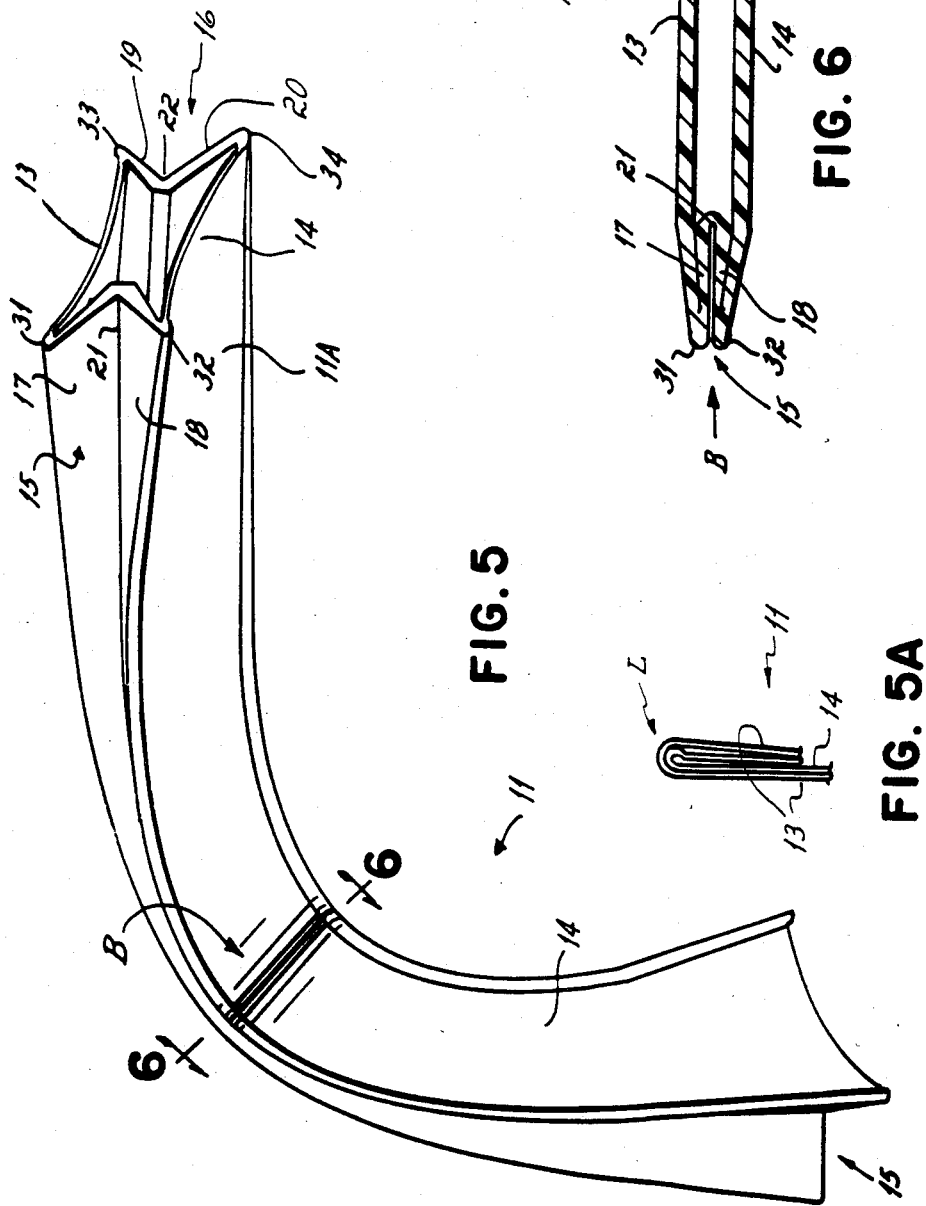

TRAFFIC DELINEATOR

This invention relates to self-restoring elongated members, and more particularly to self-restoring traffic delineators, although useful in other environments as well.

Traffic delineators are useful in traffic management and particularly in directing traffic around construction and repair sites, detours, accident scenes, and the like. When such delineators are used in areas where they are likely to be hit by a vehicle, it is desirable to have them spring back or "restore" themselves to their original position so they continue to effectively delineate a traffic direction.

While numerous types of traffic delineators are available, many of them have one or more inherent disadvantages which make them less than totally suitable for universal application. For example, when a delineator is engaged by a vehicle, it must bend and then, if it is to still be effective, must return to its pre-engaged position. While various types of traffic delineators have been proposed, many of them do not have the capability of durability needed to withstand repeated impact. Where the upstanding member is itself bent, the stresses exerted on the materials, including creasing of the materials, may not permit immediate and repeatable restoration to the pre-bent condition. Further, repeated bending stresses exerted on the post member tears, creases or breaks the material destroying the device. Some posts are associated with other resilient members for bending or for restoring the knocked-over elements. This causes increased complexity, cost and, depending on rigidity of the upstanding member, attachment failure, with certain units, due to the resulting leverage forces exerted on the base unit by the upright when impacted.

Other posts may not have sufficient rigidity to withstand wind and other forces which should not move the delineator, or are so rigid that their self-restoring capabilities are either too slow or not capable of bending in a second direction without failure.

Another common component failure is the destruction of the reflective material affixed to the devices for nighttime visibility and which is caused by the abrasive engagement of the material by the vehicle.

Also, such delineators must have provisions for adequately securing them to a road or ground surface. Such bases must be secure against removal when the upstanding delineator is engaged, for example, by a vehicle. Further, the upstanding member or post on many delineators is difficult to replace when damaged.

It accordingly has been one objective of the invention to provide an improved traffic delineator.

A further object of the invention has been to provide an improved, one-piece, self-restoring post for a traffic delineator.

A further objective of the invention has been to provide an improved base for a traffic delineator, capable of securement to various surfaces and by various modes.

A further objective of the invention has been to provide a traffic delineator including a base and upstanding post combination which is inexpensive, lightweight, repeatedly self-restoring, and long lived when subjected to numerous impacts and overruns.

A further objective of the invention has been to provide a post for a traffic delineator which post is usable with a number of different bases for mounting on different surfaces.

An associated and further objective of the invention has been to provide an improved, elongated self-restoring member capable of being bent repeatedly and being repeatedly self-restoring to its pre-bent condition without significant deterioration of its self-restoring capacity.

To these ends, a preferred embodiment of the invention comprises a traffic delineator having a base and a self-restoring post comprising an integral, hollow post, formed in a box-like cross-section. The post has forward and rearward faces, preferably concave, and inwardly directed sidewalls having apices disposed between the faces. Grooves run along the interior juncture of the sidewalls and the faces at each corner to facilitate flexure of the sidewalls with respect to the faces. When the forward or rearward face of the post is bent over, the sidewalls bend or collapse together about the respective apices and inwardly. They then bend, with the faces, across their surface at the bend location. When the bending force is removed, the elasticity of the faces and sidewalls causes them to straighten and the entire post to self-restore. Also, the sidewalls tend to open about their apices and these opening forces urge the integral post into a restored, box-like condition. Preferably, the post faces are slightly concave for on-road use, but alternatively may be convex, for off-road use as will be described. These configurations, in combination with the sidewalls, provide an even more rigid post in normal condition, yet a post which is still capable of bending when subjected to the impact of a moving vehicle, for example.

As a result of this construction, the post in its normal condition is relatively rigid and formed of a strong, rigid, box-like in cross-section, construction. Nevertheless, when engaged by an obstruction, such as a moving vehicle, the sidewalls collapse inwardly and the post thus presents not a box-like configuration, but four flat adjacent surfaces at each side which are more easily bent thereacross than would be a post having a non-collapsible box-like configuration. In other words, the box-like configuration collapses so all walls are in substantially parallel planes at the bend area. This prevents destructive stressing of the components, and provides a strong box section post which can readily be bent when subjected to a predetermined force.

Accordingly, the post of the invention provides a rigid, box-section configuration, resistant to bending, but collapsible upon any significant impact to permit controlled bending without diminishing the self-restoring characteristics of the post. This construction permits the use of materials which are relatively soft in a planar configuration, but provide a relatively rigid post when formed in the box-like configuration described.

In other words, the self-restoring flexing or flexural properties of relatively soft materials are significantly enhanced when the materials are formed in the described box-like configuration, thereby providing greater self-restoring capabilities in a relatively rigid post.

The preferred base includes a post receiving receptacle with a mounting projection extending from the bottom of the receptacle up into the post. Locator pins are inserted into the base from each side, through the respective post sidewalls, and into the interior projection of the base where they are releasably latched. Ribs in the receptacle engage and position the post faces, and are slightly curved at their tops to prevent wear of the post faces when the post is bent at the base. These ribs extend out to the ends of the base, increasing the strength of the base and the post receiving receptacle.

The bottom of the base is provided with a plurality of ribs extending, initially, perpendicularly from the center of the elongated base. The ribs then bend out at 90° and lie transversely to the base elongation. These ribs strengthen the base, and form grooves in both longitudinal and transverse sections, for holding adhesive to provide for resistance of base movement in either longitudinal or transverse directions when the base is adhered to a surface.

The delineator according to the invention is particularly well adapted to repeated flexings by traffic and to mounting on varied surfaces in varied modes, such as by pins or nails extending into the surface through the base, adhesives, and the like.

Further, the post comprises concave faces and such a post is preferably used with the preferred base first described above for on-road applications.

Moreover, in another embodiment a base comprising a tube can be driven into a surface, such as soil, to serve as a base for a post having convex faces. The sidewalls of the post are collapsed inwardly and the convex faces bulge outwardly in semi-circular fashion. The post is then inserted into the tube to serve, for example, as an off-road delineator. Such a post having convex faces can also be used with the preferred base mentioned above.

It will also be appreciated that when the relative rigidity of the box-like post is overcome by initial bending, the relatively soft materials present flat surfaces in the bend area, reducing the amount of leverage forces exerted on the remaining straight post and the base. This thus reduces overall leverage forces tending to lift portions of the base from the attachment surfaces.

Also, it will be appreciated that the self-restoring post may be used in other environments where a self-restoring member is required. Other applications, such as in using the post as a spring or motor, may be readily appreciated.

Other objectives and advantages will become readily apparent from the following detailed description of a preferred embodiment of the invention, and from the drawings in which:

FIG. 3 is a cross-sectional view of a preferred post of the delineator of FIG. 1;

FIG. 4 is a cross-sectional view of an alternative post useful in a delineator as shown in FIG. 1;

FIG. 4A is a view of an alternate base mounting for the post of FIG. 3;

FIG. 4B is a top plan view of the post of FIG. 3 mounted within the alternate base of FIG. 3A, and taken near the alternate base;

FIG. 5 is a perspective view of the post of the delineator of FIG. 1 shown in a bent condition;

FIG. 5A is a reduced side diagrammatic view of the post of FIG. 5, bent back upon itself; and FIG. 6 is a cross-section of the post of FIG. 5 taken at the bend line along lines 6—6 and approximates the position of the materials along the bend.

Figure 1:
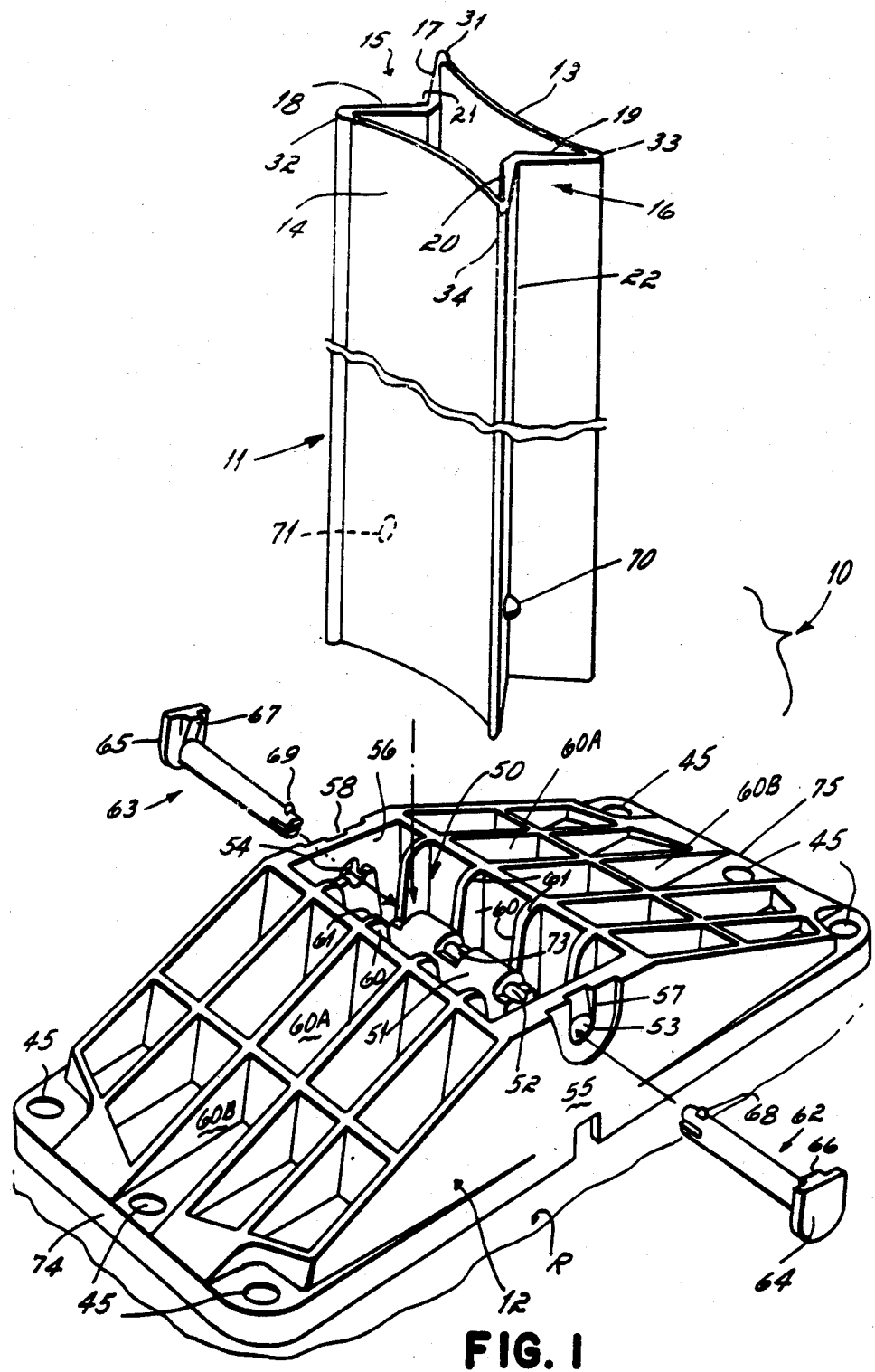
FIG. 1 is an exploded perspective view of a preferred embodiment of a delineator according to the invention.

Turning now to the drawings, there is shown in FIG. 1 thereof a preferred embodiment of the invention comprising a traffic delineator 10 having a marking standard or post 11 and a base 12 which mounts the delineator 10 on a surface, such as a road surface R, or any other suitable mounting surface, such as a curbing, traffic island, raised median or the like.

The preferred post 11 has a rectangular or box-like cross-section, as best seen in FIG. 3. Post 11 includes a forward face 13, a rearward face 14 and sides 15 and 16, which join together respective edges of the forward and rearward faces. As shown in FIG. 3, the post 11 is substantially hollow and the forward and rearward faces 13, 14 are slightly concave in shape. Side member 15 includes inwardly directed or tapered portions 17 and 18, while side member 16 includes inwardly directed or tapered portions 19 and 20. Portions 17 and 18 meet at an apex 21, while portions 19 and 20 meet at an apex 22. Side portion 17 joins forward face 13 at a corner 23, which extends along the edges of the portion 17 and the forward face 13. Likewise, side portion 18 meets the rearward face 14 at a corner 24, which extends along the side portion 18 and the rearward face 14. Side portion 19 of sidewall 16 meets the forward face 13 along a corner 25 which extends along the side portion 19, and the side portion 20 meets the rearward face 14 along a corner 26 which extends along the side portion 20 and the rearward face 14. Respective elongated grooves 27–30 are defined at the respective corners 23–26, interiorly of the post 11.

It will also be appreciated that elongated ribs extend outwardly of the corners 23–26, these ribs being numbered, respectively, 31–34. Finally, it will be appreciated that the portions 17 and 18 of the side 15 taper inwardly such that there is an angle 35 of about 90° therebetween. Similarly, portions 19 and 20 of the sidewall 16 taper inwardly so that there is an angle 36 of about 90° therebetween. As a result, each sidewall portion forms an angle of about 35° with respect to the face to which it is attached. Accordingly, the marking standard or post 11 comprises a box-like configuration.

Preferably, the post is manufactured by extrusion or by other suitable forming techniques. The post is made from various flexible materials including, for example, polyethylene, polyurethane, vinyl compounds, rubber, etc. A material composed of a copolymer of ethylene and vinyl acetate, or a material composed of EPDM rubber and polypropylene, each of which can be bent through 90° and beyond with stressing the material beyond its limit of elongation (elasticity) can be used. Yet, when the material is formed in the box-like cross-sectional configuration as shown in FIG. 3, it comprises a post having a significant predetermined resistance to any undesirable bending such as by wind. It will be appreciated that the thicknesses of the walls of the various faces and sidewalls are approximately 0.125" thick, except in the grooved areas 27–30 which comprise elongated relieved portions extending between the respective forward and rearward faces and the attached sidewalls.

It will also be appreciated that the materials in planar form are significantly less rigid relative to the materials in the box-like post configuration as described.

Turning momentarily to FIG. 4, an alternative post 40 has a forward wall 41, a rearward wall 42, a sidewall 43 and a sidewall 44. It will be noted in FIG. 4 that the forward and rearward walls 41, 42 form, together with the sidewalls 43 and 44, a hollow, box-like cross section wherein the forward and rearward walls 41, 42 are convex. Accordingly, the sidewall portions form an angle of about 45° with respect to the convex sidewalls to which they are attached. The included angle between the other portions of each sidewall remains approximately 90°. With these exceptions, the post 40 as shown in FIG. 4, is similar to the post 11 as shown in FIG. 3. Various features of post 40 similar to post 11 are similarly numbered with the addition of the suffix "a".

Turning now to FIG. 1, there is shown a preferred base 12 which is suitable for securing the delineator 10 to a road surface R, or to any other suitable surface. This is accomplished, for example, by driving spikes or other fasteners through apertures 45 in the base 12 and into the supporting surface, or by adhesively securing the base to a surface.

The base 12 includes a post receiving receptacle 50 for receiving the post 11 therein. Provided within the receptacle 50 is an upstanding projection 51, molded so as to have a transverse passageway 52 therethrough. Apertures 53 and 54 are located in the sidewalls 55 and 56 of the base and relieved portions 57 and 58 are cut into the respective sidewalls 55 and 56.

Vertical post supporting ribs 60 extend into the receptacle 50 and provide supporting surfaces for engaging the forward and rearward faces of any respective post utilized in connection with the base and such as the forward and rearward faces 13 and 14 of the post 11, or the faces 41, 42 of the alternate post 40. The tops of the ribs 60 are curved as at 61 to provide a smooth transition area for bending of the post as it is bent over with respect to, and at, the base.

Mounting pins 62 and 63 are provided at each side of the base and comprise respective heads 64 and 65, each having an anti-rotation rib 66, 67, respectively. Each pin has a forward split end and a detent 68, 69, respectively.

In use, the pins are inserted through the apertures 53 and 54 in the base sidewalls, through the apertures 70 and 71 in the post 11, and into the upstanding projection 51 in the post receptacle 50. The detents 68 and 69 on the forward split ends of the pin slip through the apertures and come to rest in a central relieved area 73 of the upstanding projection 51, which area 73 communicates with the transverse passageway 52, wherein the pins reside. Once the detents 68 and 69 extend through the aperture 73, the pins are secured within the base and maintain a post therein. The ribs 66 and 67 are engaged in reliefs 57, 58 to prevent rotation of the pins and thus any inadvertent loosening of the detents, with respect to the projection 51 by rotation, such as may depress the detents by engagement with edges of aperture 73.

It will be appreciated that each of the ribs 60 extends rearwardly and outwardly to respective ends 74, 75 of the base. For example, a rib 60 extends rearwardly through integral rib portions 60A and 60B which taper from a maximum height, at the end of the post receiving receptacle 50, to a height dimension which is preferably flush with the base at its outer end 74. The other ribs 60 on this side of the base and on the other side of the base are formed similarly, with the ribs on the other side of the base extending to the outer edge 75 of the base. These ribs provide significant support for the post 11 as it is bent with respect to the base, and provide support for the post engaging surfaces of the respective ribs 60.

Figure 2:
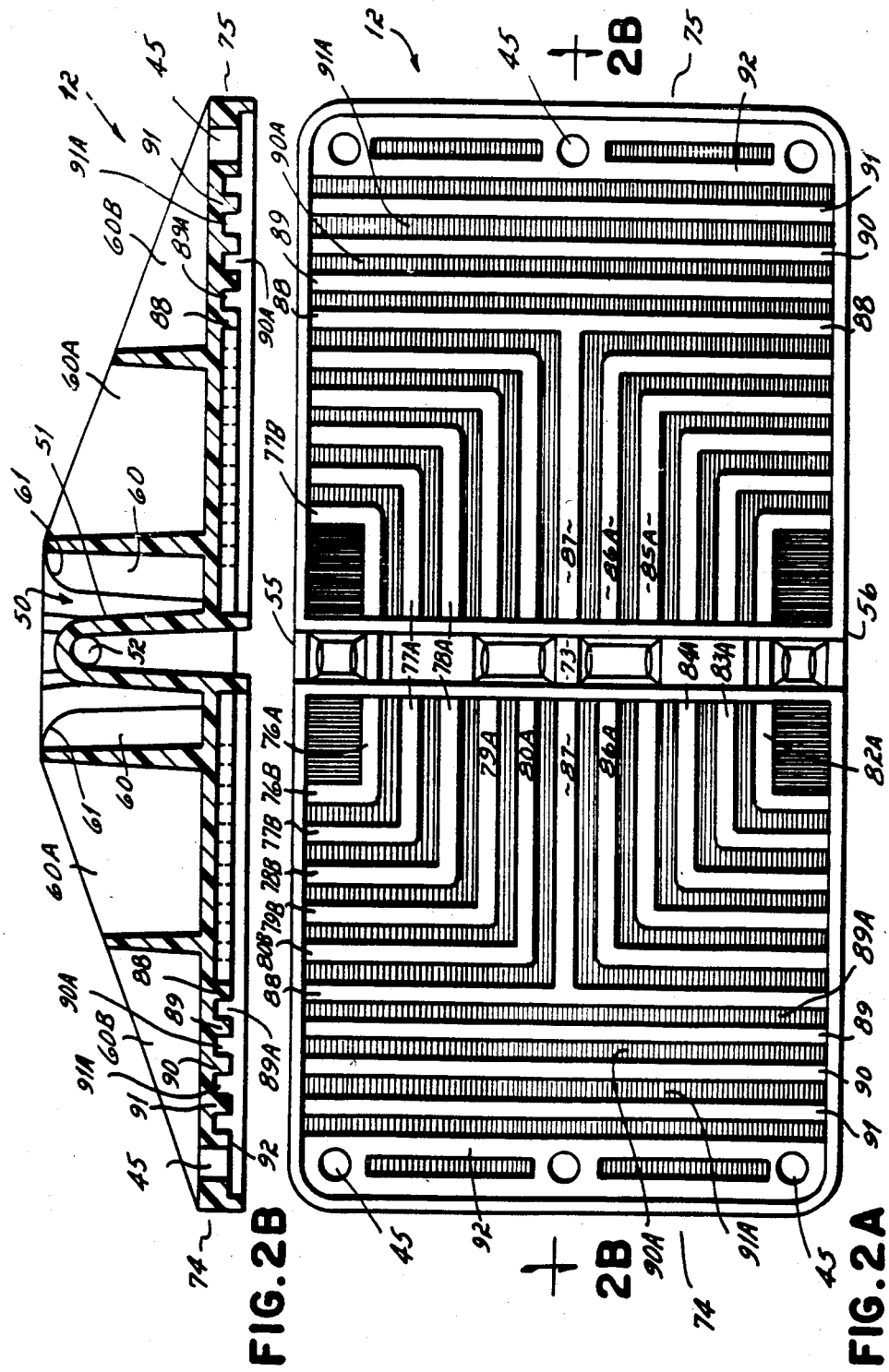
FIG. 2A is a bottom plan view of the base of FIG. 2.
FIG. 2B is a cross-sectional view taken along lines 2B—2B of FIG. 2A.

Turning now to FIG. 2A, there is shown a bottom plan view of the base. The base is preferably provided with a number of particularly configured ribs in order to permit the base to be positively secured to a surface such as road surface R. In particular, the base is provided with a plurality of ribs 76–80 and 82–86, each of which has a longitudinal portion, identified by the number of the rib together with the suffix "A", and an integral transverse portion identified by the number of the rib with the suffix "B". A longitudinal T-shaped rib having a longitudinal portion 87 and a transverse portion 88 is provided between the set of ribs 76–80 and the set of ribs 82–86. Thereafter, transverse ribs 89–92 extend across the base. The other side of the base is similarly configured.

It will be appreciated that grooves are located between the respective ribs such as are shown at 89A, 90A and 91A in FIG. 2B. These grooves, as shown in FIG. 2B, extend transversely, while other grooves, lying parallel to the rib portions 76A–80A and portions 82A–86A, extend longitudinally with respect to the base. When it is desired to permanently secure the base to a surface, such as a road surface R, the base can be secured thereto by the utilization of adhesive such as an appropriate epoxy or any other suitable adhesive. This adhesive is placed into the respective grooves as described above, or is applied to the road surface, whereupon the base and the road surface are joined together with the grooves and ribs providing, in combination, a highly "toothed" or "roughened" surface which functions to secure the base against movement in either the longitudinal or transverse directions. In other words, the transverse grooves lying between the ribs 88–92 and between the transverse portions of the ribs 76–80 and 82–86 tend to secure the base against motion in the longitudinal direction, that is, motion in the direction lying parallel to the base between the ends 74 and 75. The other longitudinally extending grooves tend to secure the base against motion in a transverse direction. The grooves also provide structural rigidity to the base 12.

FIGS. 4A and 4B disclose an alternative form of base useful with the post configuration as shown in FIG. 4. In some installations, it is desirable to secure a traffic delineator in an area where a base such as that shown in FIG. 2 may be eliminated and a somewhat simpler base utilized. Accordingly, where it is desirable to erect a traffic delineator in unpaved surfaces, such as dirt or soil, a base comprising a tube 95 is used. Tube 95 may have its forward end tapered, pinched, or otherwise closed to form a point or a wedge, and is simply driven into the ground, providing an upward circular opening 96. The alternative post 40, as shown in FIG. 4, can be configured by squeezing, such that the portions 17a and 18a of the sidewall 43 and the portions 19a and 20a of the sidewall 44a collapse inwardly and together, thereby producing a circular configured post such as that shown in FIG. 4B. Such a circular post as shown in FIG. 4B can be inserted into the opening 96 of the driven base 95 in order to provide a delineator.

As noted hereinabove, it is highly desirable to provide a traffic delineator having an upstanding post, such as a post 11, which may be repeatedly bent, such as when engaged by a moving vehicle, and yet which is capable of self-restoring itself to its upright position once the bending force is removed or the vehicle is moved away from the post, for example. Also, it is necessary to provide a traffic delineator wherein such forces such as wind and the like do not tend to bend or move the post. The box-like post structure, as described hereinabove, has proved to be sufficiently rigid as a result of its box-like structure in order to withstand forces such as normal wind forces exerted on traffic delineators and despite the use of relatively soft materials. Nevertheless, the relatively rigid box-like post structure can be easily collapsed and bent when engaged by a moving vehicle, for example, and yet is readily self-restoring as will now be described.

While the post when engaged by a vehicle will usually bend over at the base, FIG. 5 illustrates the bending of a post, such as a post 11, in an intermediate area thereof. The bend such as shown at the position B on the post may occur anywhere along the post, although it is understood most likely the bend may occur at the very bottom of the post where the post enters the post receiving receptacle 50 of the base 12. It is for this reason that support ribs 60 have curved surfaces 61 in order to prevent any excessive wear of the post.

Even though the post is bent, the various portions of the post are not bent beyond their elongation capabilities and the post is immediately self-restoring. This is accomplished by means of controlling and defining the areas of actual bend in the post material, such that none of the particular components are over stressed. In particular, it will be appreciated that when the post is bent, it is first collapsed so that portions 17 and 18 of sidewall 15 and portions 19 and 20 of sidewall 16 are bent through the respective angles 35 and 36 so as to lie generally along side one another. Also, the faces 13 and 14 are drawn inwardly so that their outer edges lie along side the respective portions 17 and 18 at the one side, and 19 and 20 at the other side, of the respective collapsed sidewalls 15 and 16. Accordingly, a bend B is formed across the post in an area where the entire post presents no surface lying in a plane which is perpendicular to the bend, rather all surfaces at the bend lie now in a plane substantially parallel to the axis of the bend. For example, and as viewed in FIG. 5, an upper portion 11A of the post 11 has been bent to the right, as viewed in FIG. 5, at the bend area B. This tends to bend the entire post about the rearward face 14 with the sidewall portions 17 and 18 having collapsed or rotated about the apex 21 and the side portions 19 and 20 having collapsed about the apex 22. Thus, at the bend area, only generally parallel flat surfaces are provided for bending and there is no resistance to bending provided by any surface lying in a plane perpendicular to the bending direction. The box-like structure is thus first collapsed so that no sidewall is over stressed.

Once the bending force is removed, the natural tendencies of the slightly stressed or compressed materials in the faces 13 and 14, together with the natural tendency of the portions 17, 18 and 19, 20 to return to their natural separated state, as shown in FIG. 3, immediately restores the post to its original and straight, unbent condition. In particular, not only do the concave faces 13 and 14 tend to restore themselves by returning to their normal unbent condition, but the sidewalls tend to spring outwardly to their normal tapered position as shown in FIG. 3. This outward springing of the sidewalls urges the collapsed faces 13 and 14 apart and toward their original box-like configuration as shown in FIG. 3, thereby urging post 11 to its elongated, straightened configuration.

It will be appreciated that while the post may be bent at the bend area B, such as shown in FIG. 5, the sidewall portions 17, 18 and 19, 20 are collapsed inwardly to varying degrees. For example, the portions 17, 18 and 19, 20 may be in engagement with each other at the particular bend area, but then begin to taper apart as the distance increases from the bend area. Accordingly, then, the bend is highly defined along a particular area where the faces and the sidewalls lie parallel to each other and there is no over stressing of any part of the upstanding post in a bending configuration. In addition, the unbent, unstressed sides adjacent the bend area and tapering outwardly therefrom exert forces on the bend area tending to supplement or augment the self-restoring capabilities of the post at the bend area.

Moreover, it will be appreciated that the relieved areas or elongated grooves 27–30 facilitate the collapsing of the respective portions of the sidewalls together with their adjacent respective forward or rearward faces, all to promote collapsing of the box-like structure when the post is engaged by a moving vehicle.

Referring to FIG. 5A, the post of FIG. 5 is diagrammatically shown bent over upon itself to a greater degree than in FIG. 5. It will be noticed that the sidewalls and faces of the post form themselves into a loop "L" at the bend, the components following a curve about the loop "L" rather than creasing or tearing.

It will also be appreciated that the ribs 31–34 may extend outwardly to such an extent as to provide a significant amount of protection for the outer concave surfaces of the faces 13 and 14 and prevent the scraping of the entire face by engagement of any portion of a vehicle thereover. In this regard, reflective material may be positioned in desired places on the outer surfaces of the forward and rearward faces 13 and 14 for the purpose of rendering the post 11 more highly visible during nighttime.

It will also be appreciated that the bending of the post is accomplished by defining various predetermined bending areas in the structure such that the bending of the post, when struck by an obstacle, is accommodated so as not to destroy the self-restoring features of the post. That is to say, the engagement of the post provides a collapsing of the faces and sidewalls about the corners 23–26 and about the apices 21, 22 before the post is bent over, all to render the sidewalls generally parallel with the forward and rearward faces at the bend such that no component of the box-like structure is over stressed by the bending. Nevertheless, the post is immediately self-restoring to provide a box-like configuration having a substantial relative rigidity when compared to the bent portion of the post.

Reconsidering momentarily FIG. 4, it will be appreciated that the post 40 as shown in FIG. 4 also provides a box-like construction for a post which operates substantially similarly to that post 11 as described above, and which can be used with either the base 12 (FIG. 1) or the tubular base of FIGS. 4A and 4B. It will be appreciated that the convex faces 41 and 42 operate in conjunction with the respective sidewalls as shown in FIG. 4, in a similar way to the corresponding sidewalls of post 11 in order to accommodate defined bending of the various components of the construction when the post is subjected to a bending force, so as not to reduce the self-restoring characteristic of the post.

While as stated above it is most likely that a post will be bent at the base such that a rearward or forward face engages and is bent over the curved relieved surfaces 61 (FIG. 1), it may also occur that a post is bent at any other portion thereof. This may occur, for example, when a vehicle overruns a delieneator, stops while over the delineator, and backs up, thereby bending the upper end of the post in an opposite direction. Since the entire post is bendable along its length in the manner as described above, such an operation would not destroy the post, nor its self-restoring capability throughout its length, even though bent at 90° or more.

When the post is bent over at the base, the leverage forces tending to lift on end of the base, and which may be anticipated, are greatly reduced by use of the posts as described. Due to the relatively flexible materials used, bending of the post at the base does not exert significant leverage forces which have a capacity to lift the base against its attachment to a road surface for example. Instead, the forces are taken up within the collapsing post itself and are stored, tending to restore the post once the bending force is removed, rather than lifting the base. This is due to the face that at the bend, the materials are relatively flat, and the bending is more easily accomplished due to collapsing of the post. Accordingly, it will be appreciated that the box-like configuration of the post permits use of more flexible materials when in turn exert less undesirable leverage forces on the base when the otherwise relatively rigid post is bent.

Moreover, it should be appreciated that the post as described herein can be used in other environments than traffic delineators, such as where a relatively rigid box-like structure is required, but which can be easily collapsed to accommodate a bend and yet be self-restoring. In this regard, it will be appreciated the post could be used to function as a hinge, spring or a motor having a relatively high initial resistance to bending, and yet permitting bending through a relatively large arc of 90° or better while still retaining its self-restoring capability to an elongated position.

It will also be appreciated that the various self-restoring properties of the elongated post, as described herein, may vary with respect to the various materials utilized in the post and that other and further actions or dynamics within the structure itself serve also to promote the self-restoration of the post after it is bent.

Finally, as clearly shown in the drawings, it will be appreciated that the forward and rearward walls of the post member of each embodiment herein are of substantially equal width, that the sides or side walls are angular and are also of substantially equal depth and breadth, and that the entire post of each embodiment defines a symmetrical shape.

These and other modifications and advantages will become readily apparent to those of ordinary skill in the art without departing from the scope of the invention, and the applicant intends to be bound only by the claims appended hereto.

We claim:

1. A traffic delineator comprising: a base and an elongated, self-restoring post extending upwardly from the base, wherein said post comprises an integral, hollow member having a forward face having a predetermined width, a rearward face having a predetermined width approximately equal to that of said forward face, and two sides, each of said sides being collapsible inwardly upon bending of said post by a bending force, and said post being self-restoring into its original shape when said bending force is removed without creasing.

2. A traffic delineator as in claim 1, wherein said respective sides of said post project inwardly between said forward and rearward faces.

3. A traffic delineator as in claim 2, wherein said forward and rearward faces are concave.

4. A traffic delineator as in claim 2, wherein said forward and rearward faces are convex.

5. A traffic delineator as in claim 4, wherein said base comprises a hollow tube, wherein the sides of said post are collapsed inwardly, wherein said convex faces define substantially semi-circular shapes, and wherein said post is disposed within said hollow tube and extends outwardly thereof.

6. A traffic delineator comprising: a base and an elongated, self-restoring post extending upwardly from the base, wherein said post comprises an integral, hollow member having a forward face, a rearward face, and two sides, each of said sides being collapsible inwardly upon bending of said post by a bending force, and said post being self-restoring into its original shape when said bending force is removed without creasing, wherein said respective sides of said post project inwardly between said forward and rearward faces, and wherein said sides are respectively integrally joined to said forward and rearward faces to form corners and further including elongated grooves extending along said corners interiorly of said post.

7. A traffic delineator as in claim 1, wherein said base includes a post receiving receptacle having a projection extending upwardly from a bottom thereof and into said post, said projection having a plurality of transverse pin receiving passageways therethrough, and wherein said delineator further includes at least two removable pins extending through said base and said post, said pins and said projection removably securing said post within said base receptacle, and said pins having a longitudinal axis extending from one side wall of said post to the other side wall of said post.

8. A traffic delineator as in claim 7, wherein said two removable pins respectively extend inwardly from a respective side of said base, through one side of said post, and into said projection.

9. A traffic delineator as in claim 8, further including means on said base and said pins for securing said pins against rotation in said base, and detent means on inward ends of said pins for releasably retaining said pins in said projection.

10. A traffic delineator as in claim 7, further including a plurality of rib means extending into said receptacle from opposite sides thereof for engaging and positioning faces of said post within said base.

11. A traffic delineator comprising: a base and an elongated, self-restoring post extending upwardly from the base, wherein said post comprises an integral, hollow member having a forward face, a rearward face, and two sides, each of said sides being collapsible inwardly upon bending of said post by a bending force, and said post being self-restoring into its original shape when said bending force is removed without creasing, wherein said base includes a post receiving receptacle having a projection extending upwardly from a bottom thereof, said projection having a transverse pin receiving passageway therethrough, wherein said delineator further includes at least one removable pin extending through said base and said post, said pin and said projection removably securing said post within said base receptacle, and said base further including a plurality of rib means extending into said receptacle from opposite sides thereof for engaging and positioning faces of said post within said base, wherein tops of said rib means define relief curves supporting a face of said post when said post is bent.

12. A traffic delineator as in claim 10, wherein said rib means extend away and outwardly from said receptacle in opposite directions towards opposite ends of said base.

13. A traffic delineator as in claim 12, wherein said rib means taper downwardly from a maximum height proximate said receptacle to a minimum height proximate respective ends of said base.

14. A traffic delineator as in claim 1, wherein said base includes a plurality of rib means extending from a bottom thereof, at least one of said rib means having a first portion extening longitudinally away from a center of said base and a second transversely extending portion continuing from said first portion and substantially perpendicularly to said first portion.

15. A traffic delineator as in claim 1, wherein said base includes a plurality of longitudinally and transversely extending rib means projecting outwardly from a bottom of said base.

16. An integral, elongated, shape-restoring member comprising elongated forward and rearward faces having outer edges and two elongated sides between said forward and rearward faces and within the respective outer edges thereof, said sides extending inwardly toward each other between said faces and being further collapsible toward each other upon application of a bending force to one of said faces, said member being repeatedly bendable about one of said faces by the application of a bending force thereto, and said member being repeatedly self-restoring when said bending force is removed.

17. An integral, elongated, shape-restoring member comprising elongated forward and rearward faces and two elongated sides between said forward and rearward faces, said sides extending inwardly toward each other between said faces and being further collapsible toward each other upon application of a bending force to one of said faces, said member being repeatedly bendable about one of said faces by the application of a bending force thereto, said member being repeatedly self-restoring when said bending face is removed, and wherein said sides and faces are joined together integrally forming corners, and further including elongated grooves extending along said corners interiorly of said member.

18. A shape restoring member as in claim 17, wherein said sides form angles of about 35° to about 45° with said faces when said member is in its elongated, unbent shape.

19. A shape restoring member as in claim 18, wherein said faces are concave.

20. A shape restoring member as in claim 18, wherein said faces are convex.

21. A traffic delineator as in claim 2, wherein said respective sides each comprise two portions, one joined to a forward face and one joined to a rearward face, said portions being joined together along an elongated apex, the apex of one side moving toward the apex of another side upon bending of said post such that said faces and said side portions are disposed in a substantially parallel disposition at an area in which said post is bent.

22. A traffic delineator as in claim 1, wherein forces exerted on said post causing said post to bend are absorbed within the post.

23. A traffic delineator as in claim 1, wherein said post is self restoring after being subjected to bending forces bending said post beyond 90°.

24. A traffic delineator as in claim 1, wherein said sides each comprise two elongated portions of substantially equal width joined along an elongated apex and diverging away from said apex and the hollow interior of said post outwardly to said forward and rearward faces.

25. A traffic delineator as in claim 10, wherein said rib means have post face engaging surfaces disposed along said faces and wherein said faces are one of convex and concave configuration.

26. A self-restoring traffic delineator comprising an integral post having a forward face, a rearward face and first and second side walls extending between said faces, each said side wall being hinged along elongated junctures to respective ones of said forward and rearward faces and each said side wall comprising at least two elongated portions hinged together along an elongated apex, the junctures of said side walls to said forward and rearward faces having elongated relieved areas definng elongated hinge axes therealong.

27. A traffic delineator comprising: a base for mounting on a surface and an elongated, self-restoring, symmetrical post extending upwardly from said base, wherein said post has forward and rearward faces of substantially equal width and first and second angular side walls between said forward and rearward faces, each said side wall being hinged along elongated junctures to respective ones of said forward and rearward faces and each said side wall comprising at least two elongated portions hinged together along an elongated apex, the junctures of said side walls to said forward and rearward faces having elongated relieved areas defining elongated hinge axes therealong.

28. A traffic delineator as in claim 27, wherein said elongated hinge axes defined by the relieved areas extending between the forward and rearward faces of said post and the two angular sides, respectively, in combination with the elongated hinged apex between the two portions of the angular sides of said post predispose said post to bending such that the bending forces absorbed by said post predisposition reduces the amount of bending forces transferred to said base, thereby decreasing mounting failure of said base to a surface due to leverage and pull-up forces exerted on said base by bending forces exerted on said post when said base is affixed to a surface.

29. A traffic delineator as in claim 27, wherein said angular side walls are of substantially equal depth and breadth and wherein upon application of a bending force to said post the apex of one angular side wall moves toward the apex of the other angular side wall such that portions of each angular side wall fold together and lie against respective adjacent forward and rearward faces in a substantially parallel disposition at an area in which said post is bent by a bending force.

30. An integral, elongated, shape-restoring, symmetrical member comprising elongated forward and rearward faces of substantially equal width and two elongated angular sides of substantially equal depth and breadth between said forward and rearward faces, said angular sides extending inwardly towards each other between said faces and being further collapsible toward each other in a substantially parallel disposition with said adjacent faces upon application of a bending force to one of said faces, said shape-restoring member being repeatedly bendable about either of said faces by the application of a bending force thereto, and said shape-restoring member being repeatedly self-restoring when a bending force is removed.

31. An integral, elongated, shape-restoring, symmetrical member as in claim 30, wherein said sides and faces are joined together integrally along edges thereof forming corners, and further including elongated grooves extending along said corners interiorly of said symmetrical member.

32. An integral, elongated, shape-restoring, symmetrical member as in claim 31, wherein bending forces exerted on said member squeeze the two angular side walls of said member together at an area in which said member is bent, thereby creating counter forces operable when the bending force is removed to cause the collapsed angular side walls of said member to restore to their unbent disposition.

33. An integral, elongated, shape-restoring, symmetrical member as in claim 31, wherein the elongated grooves extending along said corners interiorly of said member reduce the resistance to bending forces of said member by enabling the forward and rearward faces of said member to hinge at the grooves when the two angular side walls of said member are collapsed and squeezed together at an area in which said member is bent by a bending force.

34. A traffic delineator as in claim 1, wherein said post is bi-directionally self-restoring about either of said faces after being subjected to bending forces bending said post beyond 90°.

* * * * *

UNITED STATES PATENT AND TRADEMARK OFFICE
CERTIFICATE OF CORRECTION

PATENT NO. : 4,596,489

DATED : June 24, 1986

INVENTOR(S) : James F. Mariol & Edward G. McAuley

It is certified that error appears in the above-identified patent and that said Letters Patent is hereby corrected as shown below:

Column 1, line 40, after "not" insert --sufficiently repeatable to provide long life or not--

Column 9, line 11, "face" should be --fact--

Signed and Sealed this

Thirtieth Day of September 1986

[SEAL]

Attest:

DONALD J. QUIGG

Attesting Officer

Commissioner of Patents and Trademarks